(12) United States Patent
Dutel et al.

(10) Patent No.: US 8,567,269 B1
(45) Date of Patent: Oct. 29, 2013

(54) SENSOR MOUNTING APPARATUS AND METHOD

(75) Inventors: Lewis J. Dutel, Cypress, TX (US); Jeff Hilpert, Magnolia, TX (US)

(73) Assignee: M-I LLC, Houston, TX (US)

( * ) Notice: Subject to any disclaimer, the term of this patent is extended or adjusted under 35 U.S.C. 154(b) by 504 days.

(21) Appl. No.: 12/844,223

(22) Filed: Jul. 27, 2010

Related U.S. Application Data

(60) Provisional application No. 61/228,862, filed on Jul. 27, 2009.

(51) Int. Cl.
*G01D 11/30* (2006.01)

(52) U.S. Cl.
USPC ........................................................ 73/866.5

(58) Field of Classification Search
USPC ........................................................ 73/866.5
See application file for complete search history.

(56) References Cited

U.S. PATENT DOCUMENTS

| | | | |
|---|---|---|---|
| 6,357,470 B1 * | 3/2002 | Evans et al. | 137/317 |
| 6,401,538 B1 | 6/2002 | Han et al. | |
| 6,585,044 B2 | 7/2003 | Rester et al. | |
| 6,817,229 B2 | 11/2004 | Han et al. | |
| 6,829,947 B2 | 12/2004 | Han et al. | |
| 6,938,458 B2 | 9/2005 | Han et al. | |
| 7,117,757 B2 * | 10/2006 | Bellis, Jr. | 73/866.5 |
| 7,265,832 B2 | 9/2007 | Montgomery et al. | |
| 7,337,660 B2 | 3/2008 | Ibrahim et al. | |

FOREIGN PATENT DOCUMENTS

WO   WO 2006/063463 A1   6/2006

OTHER PUBLICATIONS

U.S. Appl. No. 12/786,925, "Apparatus and Method for Metering Flare Gas," Lewis J. Dutel, filed May 25, 2010 (co-pending application with similar subject matter).
Timothy O. Wiemers, "Produced Gas Measurement Using Ultrasonic Metering During Underbalanced Operations," IADC/SPE 108349, Mar. 28, 2007, Galveston, Texas, United States.

* cited by examiner

*Primary Examiner* — Hezron E Williams
*Assistant Examiner* — Paul West
(74) *Attorney, Agent, or Firm* — Winston & Strawn LLP

(57) ABSTRACT

An apparatus and method for mounting a sensor with strict orientation and insertion depth requirements in a process vessel or pipe section. The apparatus includes a lock block having a socket for receiving a plug disposed around a sensor inserted through an inner bore of the lock block. Reception of the plug in the socket controls insertion depth of the sensor in the process vessel. The lock block also includes a cam bore for receiving a cam used to rotationally orient the sensor and the attached plug. The cam is locked into position within the cam bore of the lock block by inserting a retaining pin through a retaining pin bore in the cam. During insertion and removal of the sensor through the sensor mounting apparatus, process isolation is maintained by an integral seal mechanism of the lock block and an internal isolation valve that fits within the lock block.

19 Claims, 3 Drawing Sheets

SENSOR MOUNTING APPARATUS AND METHOD

CROSS-REFERENCE TO RELATED APPLICATIONS

This application claims the benefit of and priority to U.S. Provisional Patent Application No. 61/228,862, filed Jul. 27, 2009.

FIELD OF THE INVENTION

The present invention relates to a sensor mounting apparatus and method for sensor probes requiring specific orientation and insertion depth such as optical flow meter and ultrasonic flow meter probes.

BACKGROUND OF THE INVENTION

Many sensors require specific orientation and insertion depth of the sensor probe for accurate measurements. These requirements apply to optical flow meters based on laser-two-focus (L2F) particulate velocimetry and optical flow meters based on laser-two-beam (L2B) particulate velocimetry. In L2F particulate velocimetry, an optical flow meter probe measures the velocity of gas particles by measuring the time delay between light scattering occurrences in two active sheets that are perpendicular to the gas flow direction and separated by a fixed distance. In L2B particulate velocimetry, an optical flow meter probe measures the velocity of gas particles by sensing the scintillation of light beams caused by flow turbulence. Both L2F and L2B types of optical flow meters require that the optical probe be positioned within a system with a specific orientation in relation to the direction of gas flow. Ultrasonic flow meters have multiple probes that have extremely tight tolerance insertion-depth requirements.

Other sensors such as temperature and pressure sensors require periodic removal for replacement, cleaning, and troubleshooting. The removal and subsequent reinstallation of these sensors occurs during operations requiring a method to remove the probe while maintaining process isolation.

SUMMARY OF THE INVENTION

It is an object of the present invention to provide a sensor mounting apparatus that efficiently orients a sensor to a specified rotational position.

It is a further object of the present invention to provide a sensor mounting apparatus that efficiently positions a sensor at a predetermined insertion depth.

It is a further object of the present invention to provide a sensor mounting apparatus that maintains process isolation during insertion and removal of a sensor.

These and other objects and advantages are achieved by the novel sensor mounting apparatus and method described herein. The sensor mounting apparatus may include a lock block, a locking cam assembly, an internal isolation valve, and a base plate. The lock block may have a first end surface, a second end surface, and two pairs of opposing side surfaces interconnecting the first and second end surfaces. The lock block may also have a socket in the first end surface, an inner bore extending from the socket to the second end surface, a cam bore extending through one of the pairs of opposing side surfaces, and an integral seal mechanism capable of sealing the inner bore. The locking cam assembly may be capable of being inserted through the cam bore in the lock block.

The internal isolation valve may be removably disposed within the lock block. The internal isolation valve may have an inner bore aligned with the inner bore of the lock block. The internal isolation valve may be capable of sealing its inner bore. The base plate may have an inner bore aligned with the inner bore of the internal isolation valve and the inner bore of the lock block. The internal isolation valve and the lock block may be operatively connected to the base plate.

The sensor mounting apparatus may also include a plug having a first end surface, a second end surface, and a side surface interconnecting the first and second end surfaces of the plug. The plug may also have a plug groove disposed on the side surface and an inner bore extending from the first end surface to the second end surface. The plug may be capable of being inserted into the socket of the lock block. Insertion of the plug into the socket of the lock block may position a sensor probe at a predetermined insertion depth within a process vessel.

The locking cam assembly may include a locking cam, a spring pin stop, and a retainer pin. The locking cam may have a head with a groove and an elongated portion with a recess and a retainer pin bore extending laterally through the elongated portion. The elongated portion of the locking cam may be capable of being inserted through the cam bore in the lock block. The spring pin stop may be positioned within the recess of the elongated portion and may engage the groove in the head of the locking cam when the head is rotated into an engaged position. The retainer pin may be capable of being inserted through the retainer pin bore in the elongated portion to secure the locking cam in position within the cam bore of the lock block.

An aperture may be formed on the lock block by an intersection of the cam bore with the socket. The plug may have an aligned position in which the sensor probe is positioned at a predetermined rotational orientation within the process vessel. The plug groove may be rotationally aligned with the aperture in the aligned position of the plug. The insertion of the elongated portion of the locking cam through the cam bore of the lock block when the plug is in the aligned position may lock the sensor probe in the predetermined rotational orientation and the predetermined insertion depth within the process vessel.

The internal isolation valve may include a ball valve. The integral seal mechanism may include one or more O-rings disposed around the inner bore of the lock block.

In another embodiment, the present invention includes a sensor mounting apparatus including a lock block, a plug, an internal isolation valve, a base plate, a locking cam, a spring pin stop, and a retainer pin. The lock block may have a first end surface, a second end surface, and two pairs of opposing side surfaces interconnecting the first and second end surfaces. The lock block may also have a socket in the first end surface, an inner bore extending from the socket to the second end surface, a cam bore extending through one of the pairs of opposing side surfaces, and an integral seal mechanism capable of sealing the inner bore.

The plug may have a first end surface, a second end surface, and a side surface interconnecting the first and second end surfaces of the plug. The plug may also have a plug groove disposed on the side surface and an inner bore extending from the first end surface to the second end surface. The plug may be capable of being inserted into the socket of the lock block. The internal isolation valve may have an inner bore aligned with the inner bore of the lock block. The internal isolation valve may be capable of sealing its inner bore when activated and may be removably disposed within the lock block. The base plate may include an inner bore aligned with the inner bore of the internal isolation valve and the inner bore of the lock block. The internal isolation valve and the lock block may be operatively connected to the base plate.

The locking cam may have a head with a groove and an elongated portion with a recess and a retainer pin bore extending laterally through the elongated portion. The elongated portion of the locking cam may be capable of being inserted through the cam bore in the lock block. The spring pin stop may be positioned within the recess of the elongated portion of the locking cam and may engage the groove in the head of the locking cam when the head is rotated into an engaged position. The retainer pin may be capable of being inserted through the retainer pin bore in the elongated portion to secure the locking cam in position within the cam bore of the lock block. The internal isolation valve may include a ball valve. The integral seal mechanism may include one or more O-rings.

In yet another embodiment, the present invention includes a method of mounting a sensor to a process vessel. The method may include providing a sensor mounting apparatus having a lock block, a locking cam assembly, an internal isolation valve, and a base plate. The lock block may include a first end surface, a second end surface, two pairs of opposing side surfaces interconnecting the first and second end surfaces, a socket in the first end surface, an inner bore extending from the socket to the second end surface, a cam bore extending through one of the pairs of opposing side surfaces, and an integral seal mechanism capable of sealing the inner bore. The internal isolation valve may have an inner bore aligned with the inner bore of the lock block. The internal isolation valve may be removably disposed within the lock block. The base plate may have an inner bore aligned with the inner bore of the internal isolation valve and the inner bore of the lock block. The internal isolation valve and the lock block may be operatively connected to the base plate.

The method may also include attaching the sensor mounting apparatus to a process vessel by connecting the base plate to the process vessel, and inserting a sensor through the sensor mounting apparatus and into the process vessel while maintaining isolation of a process within the process vessel.

The step of inserting the sensor into the process vessel through the sensor mounting apparatus while maintaining process isolation may include sealing the inner bore of the internal isolation valve by activating the internal isolation valve and inserting the sensor through the inner bore of the lock block to a semi-inserted position in which the sensor is disposed between the integral seal mechanism and the internal isolation valve. The inner bore of the lock block may then be sealed with the integral seal mechanism so that the inner bore of the internal isolation valve may be unsealed by deactivating the internal isolation valve. The sensor may then be inserted through the inner bore of the internal isolation valve, through the inner bore of the base plate, and into the process vessel.

The method may also include removing the sensor from the process vessel through the sensor mounting apparatus while maintaining process isolation within the process vessel. This step may include sliding the sensor out of the process vessel to the semi-inserted position, sealing the inner bore of the internal isolation valve by activating the internal isolation valve, and sliding the sensor out of the inner bore of the lock block.

The sensor mounting apparatus may further include a plug having a first end surface, a second end surface, a side surface interconnecting the first and second end surfaces of the plug, a plug groove on the side surface, and an inner bore extending from the first end surface to the second end surface. The locking cam assembly may include a locking cam, a spring pin stop, and a retainer pin. The locking cam may have a head with a groove and an elongated portion with a recess and a retainer pin bore extending laterally through the elongated portion. The spring pin stop may be positioned within the recess of the elongated portion. The retainer pin may be capable of being inserted through the retainer pin bore in the elongated portion of the locking cam. The sensor may include a sensor probe having a proximal end and a distal end.

The step of inserting the sensor into the process vessel through the sensor mounting apparatus while maintaining process isolation may include sealing the inner bore of the internal isolation valve by activating the internal isolation valve. The sensor probe may be inserted through the inner bore of the plug to secure the plug on the sensor probe at a predetermined position corresponding to a predetermined insertion depth of the distal end of the sensor probe in the process vessel. The sensor probe may be inserted through the inner bore of the lock block to a semi-inserted position in which the distal end of the sensor probe is disposed between the integral seal mechanism and the internal isolation valve. The inner bore of the lock block may then be sealed with the integral seal mechanism and the inner bore of the internal isolation valve may be unsealed by deactivating the internal isolation valve. The sensor probe may be inserted through the inner bore of the internal isolation valve, through the inner bore of the base plate, and into the process vessel such that the distal end of the sensor probe is positioned at the predetermined insertion depth. The predetermined insertion depth may be reached when the plug slides into the socket of the lock block.

The method may further include rotationally orienting the sensor probe in the process vessel. An aperture may be formed in said lock block by an intersection of said cam bore with said socket. The step may include aligning the plug groove with the aperture in the lock block by rotating the plug in the socket of the lock block, completely inserting the elongated portion of the locking cam through the cam bore of the lock block, rotating the head of the locking cam into an engaged position in which the spring pin stop engages the groove in the head, and locking the locking cam in the cam bore by inserting the retainer pin through the retainer pin bore in the locking cam.

Alternatively, the process of rotationally orienting the sensor probe in the process vessel may involve positioning the elongated portion of the locking cam in the cam bore; retaining the elongated portion of the locking cam in the cam bore by inserting the retainer pin in the retainer pin bore; aligning an aperture in the elongated portion of the locking cam with an aperture in the socket of the lock block so that the elongated portion of the locking cam is flush with the socket; sliding the plug within the socket; and rotating the locking cam to a position indicative of the plug being in a correct rotational orientation.

The method may further include removing the sensor probe from the process vessel while maintaining process isolation.

These and many other objects and advantages will be readily apparent to one skilled in the art to which the invention pertains from a perusal of the claims and the following detailed description of the preferred embodiments and read in conjunction with the appended drawings.

DETAILED DESCRIPTION OF THE INVENTION

Figure 1:
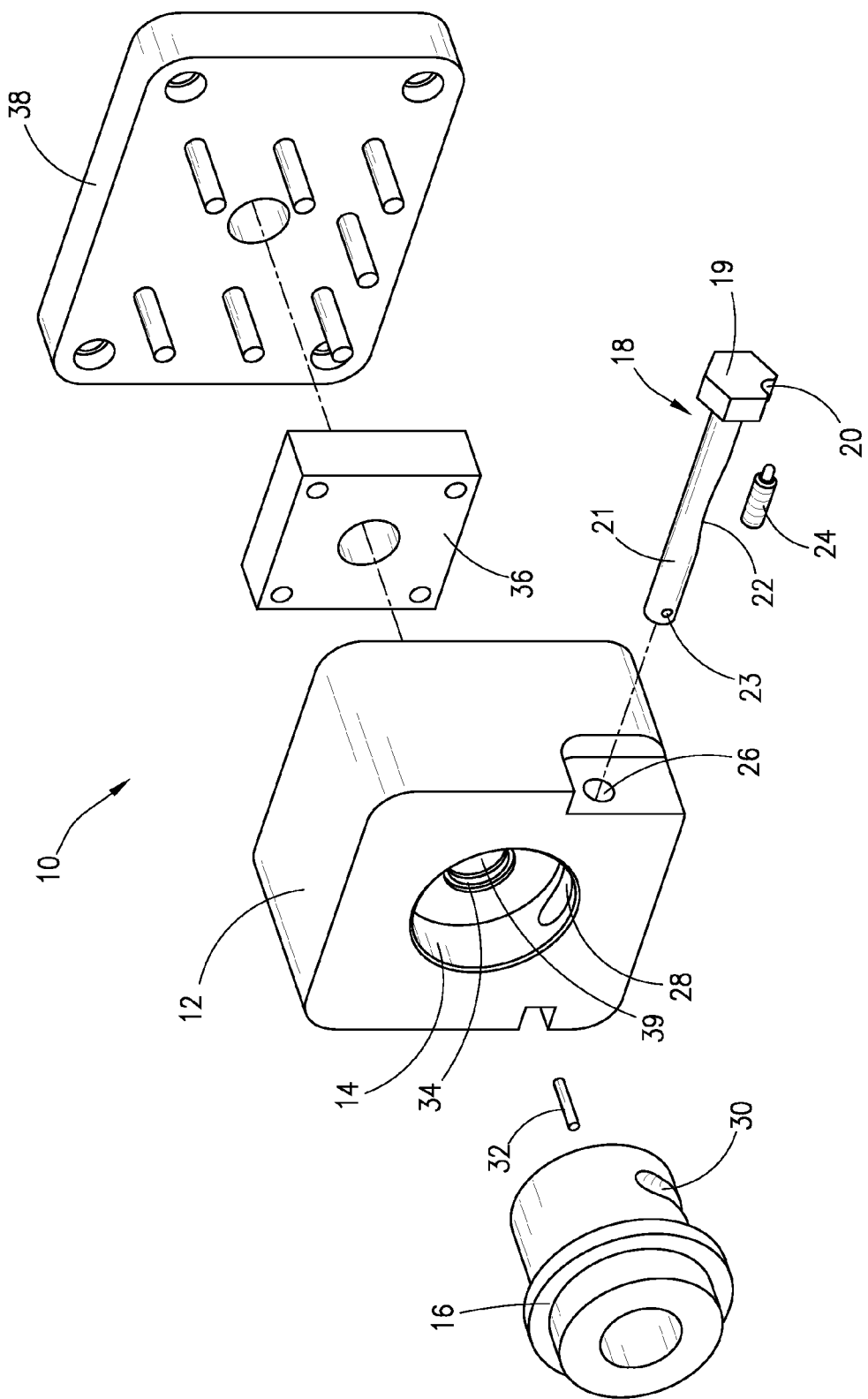
FIG. 1 is an exploded perspective view of a sensor mounting apparatus.

With reference to the figures where like elements have been given like numerical designation to facilitate an understanding of the present invention, and particularly with reference to the embodiment of the present invention illustrated in FIG. 1, sensor mounting apparatus 10 may include lock block 12 having socket 14. Socket 14 and plug 16 may allow for a specified insertion depth and orientation of a sensor. For insertion type sensors, plug 16 may be attached to a sensor shaft using a compression pin. For process sensors (e.g., temperature or pressure sensors), plug 16 may be incorporated into the sensor housing or the sensor may be threaded directly onto plug 16. Plug 16 may be inserted into socket 14 of lock block 12.

Locking cam 18 may include head 19 having groove 20. Locking cam 18 may also include elongated portion 21 having recess 22 and retainer pin bore 23. Spring pin stop 24 may be disposed within recess 22 of locking cam 18. Locking cam 18 may be capable of being inserted through cam bore 26 in lock block 12. Cam bore 26 may intersect with socket 14 at aperture 28. Locking cam 18 may orient plug 16 in socket 14 of lock block 12. After sliding plug 16 into socket 14, locking cam 18 may be inserted into cam bore 26. Plug 16 may be rotated such that plug groove 30 is aligned with aperture 28 of lock block 12. In this position, locking cam 18 may extend completely through cam bore 26 due to the space created by the alignment of plug groove 30 with aperture 28. With locking cam 18 extending completely through cam bore 26, plug 16 is rotationally aligned with and locked into socket 14. Locking cam 18 may be rotationally locked by rotating head 19 until spring pin stop 24 engages groove 20 in head 19. Locking cam 18 may be locked into cam bore 26 by inserting retainer pin 32 through retainer pin bore 23 in locking cam 18. Insertion of retainer pin 32 through retainer pin bore 23 may prevent locking cam 18 from slipping or being removed from cam bore 26.

Alternatively, and more preferably, locking cam 18 is inserted into cam bore 26 and retained therein by retainer pin 32 before plug 16 is slid into socket 14. Aperture 22 in locking cam 18 is aligned with aperture 28 by rotating locking cam 18 so there is no obstruction to prevent plug 16 from being inserted into position within socket 14 of lock block 12 (i.e., cam 18 is flush with socket 14). Locking cam 18 is then rotated. If plug 16 is correctly rotationally oriented in socket 14 (i.e., plug groove 30 is aligned with aperture 28), locking cam 18 is able to rotate to a position where a portion of locking cam 18 extends outward of aperture 28 and is no longer flush therewith. In this configuration, plug 16 is oriented in the desired rotational position. Locking cam 18 (and plug 16) are held in place by actuation of spring pin stop 24 and engagement with groove 20 in head 19.

Sensor mounting apparatus 10 may also include one or more seal mechanisms. The seal mechanisms may include integral pressure seals 34 in lock block 12 and internal isolation valve 36, which may fit into lock block 12. Integral pressure seals 34 may be O-rings. Internal isolation valve 36 may isolate a process when actuated. Internal isolation valve 36 may be a ball valve. Lock block 12 and internal isolation valve 36 may be mounted on base plate 38 such that sensor mounting apparatus 10 may be mounted onto process equipment, such as a process vessel or a section of pipe. Lock block 12 and internal isolation valve 36 may be mounted on base plate 38 by any mounting means, such as by bolt or screw. Inner bore 39 may extend through lock block 12, internal isolation valve 36, and base plate 38.

Figure 2:
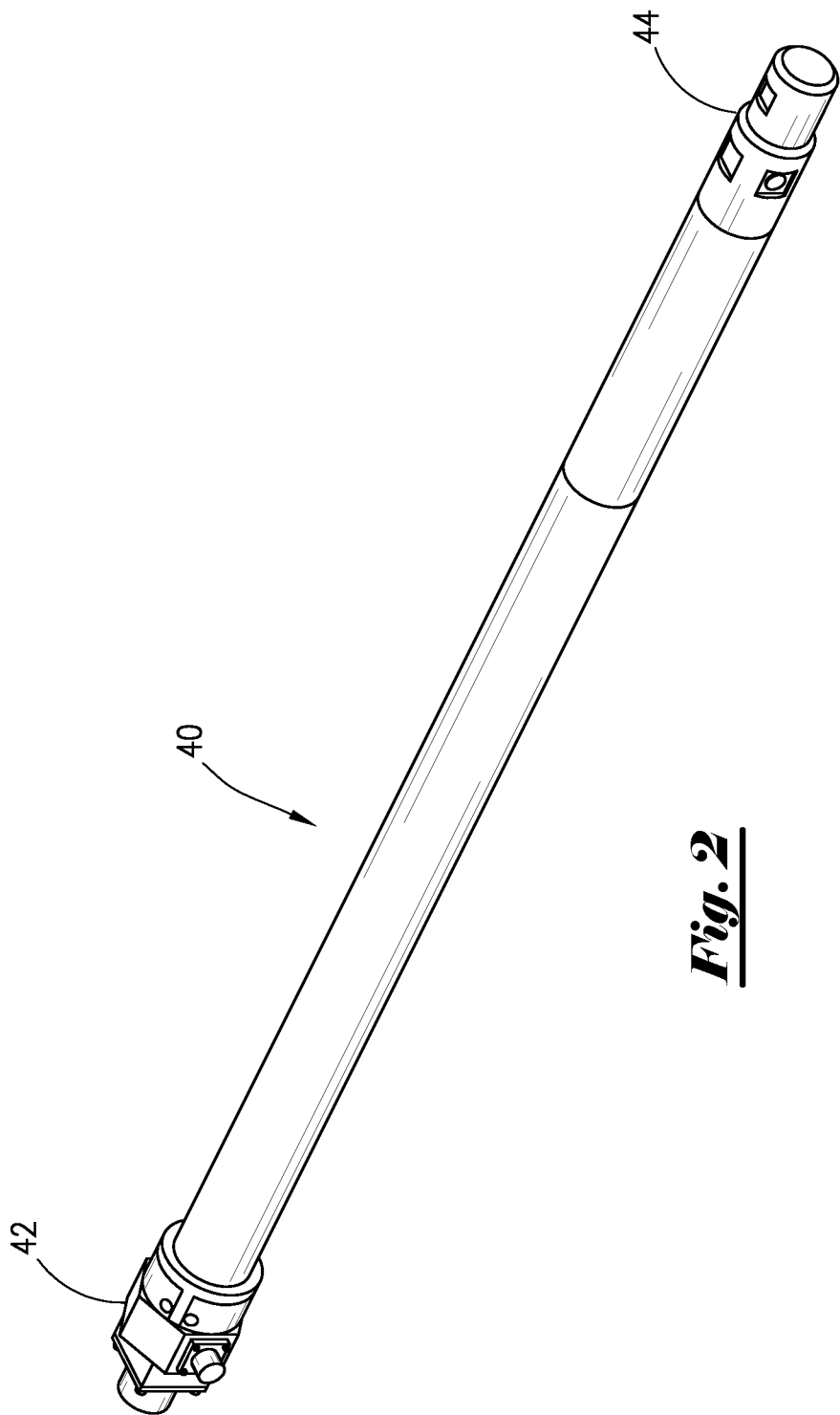
FIG. 2 is a perspective view of a sensor that may be mounted through the sensor mounting apparatus shown in FIG. 1.

FIG. 2 illustrates sensor probe 40 which may be any type of sensor probe or process sensor designed to be inserted into a process vessel or pipe section. In a preferred embodiment, sensor probe 40 may have specific rotational orientation and insertion depth requirements and/or may require process isolation during insertion and removal of sensor probe 40. Sensor probe 40 may be an optical probe for a gas flow meter functioning based on L2F or L2B particulate velocimetry. Alternatively, sensor probe 40 may be one of multiple probes of an ultrasonic flow meter that requires a specific insertion depth of each probe. Sensor probe 40 may be oriented and positioned at a specified insertion depth within a system using sensor mounting apparatus 10. Sensor probe 40 may contain proximal end 42 and distal end 44. Distal end 44 may be designed to be positioned within a process vessel or pipe section.

Figure 3:
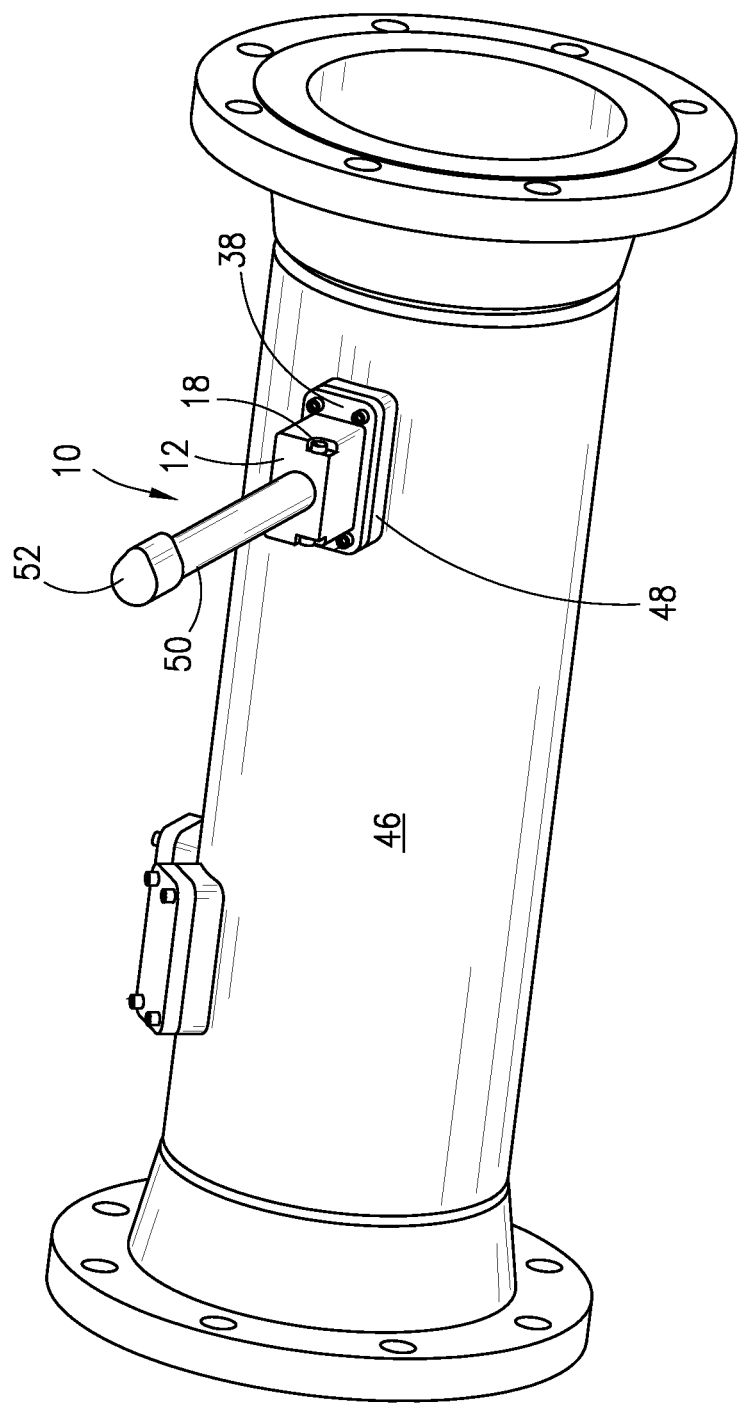
FIG. 3 is a perspective view of the sensor mounting apparatus shown in FIG. 1 mounted on a pipe section.

As shown in FIG. 3, sensor mounting apparatus 10 may be mounted onto process equipment such as pipe section 46. Base plate 38 of sensor mounting apparatus 10 may be operatively connected to mounting plate 48 of pipe section 46 by any mounting means, such as by bolt or screw. Alternatively, base plate 38 may be mounted directly onto a process vessel. Sensor probe 40 may be positioned through plug 16, inner bore 39 of sensor mounting apparatus 10, and a bore (not shown) through mounting plate 48 such that distal end 44 of sensor probe 40 is positioned within pipe section 46 at the required rotational orientation and insertion depth. Proximal end 42 of sensor probe 40 may be covered by probe sleeve 50 and probe cap 52 to protect sensor probe 40 from surrounding environmental conditions.

Referring now to FIGS. 1-3, sensor probe 40 may be mounted onto process equipment (e.g., pipe section 46) using sensor mounting apparatus 10. Lock block 12 and internal isolation valve 36 may first be connected to base plate 38. Base plate 38 may then be connected to mounting plate 48 on pipe section 46 thereby mounting sensor mounting apparatus 10 to pipe section 46. Internal isolation valve 36 may be placed in an activated position such that inner bore 39 is sealed at internal isolation valve 36.

Plug 16 may be connected to sensor probe 40 and secured at a predetermined position on sensor probe 40 using a compression pin. Distal end 44 of sensor probe 40 may then be inserted into socket 14 and inner bore 39 until distal end 44 is disposed between integral pressure seals 34 and internal isolation valve 36 (sometimes referred to as a semi-inserted position). Integral pressure seals 34 may form a seal around sensor probe 40 so that internal isolation valve 36 may be deactivated while maintaining process isolation. With internal isolation valve 36 in the deactivated position, distal end 44 of sensor probe 40 may be inserted further through inner bore 39 and through the bore in mounting plate 48. Lock block 12 may stop the insertion of sensor probe 40 when attached plug 16 slides into socket 14 as sensor probe 40 reaches the predetermined insertion depth within pipe section 46. The predetermined position of plug 16 on sensor probe 40 may be manipulated to achieve the required predetermined insertion depth for the type of sensor probe 40 used.

To rotationally orient sensor probe 40, locking cam 18 may then be partially inserted through cam bore 26 of lock block 12. If plug groove 30 on plug 16 is not aligned with aperture 28 of lock block 12, locking cam 18 will be unable to be completely inserted through cam bore 26. Plug 16 and sensor probe 40 may be rotated within socket 14 and inner bore 39 until locking cam 18 is able to be inserted completely through cam bore 26 indicating to a user that plug groove 30 and aperture 28 are aligned. In this position, sensor probe 40 is locked into the required rotational orientation within pipe section 46. The rotational position of plug 16 on sensor probe 40 may be manipulated to achieve the required rotational orientation of sensor probe 40 in pipe section 46. Head 19 of locking cam 18 may then be rotated into an engaged position in which spring pin stop 24 engages groove 20 in head 19. In the engaged position, head 19 of locking cam 18 is rotationally locked in place. Retainer pin 32 may be inserted through retainer pin bore 23 in locking cam 18. Retainer pin 32 may lock plug 16 in socket 14 to maintain the proper insertion depth of distal end 44 of sensor probe 40 in the system.

Alternatively, and more preferably, locking cam 18 is inserted into cam bore 26 and retained therein by retainer pin 32 before plug 16 is slid into socket 14. Aperture 22 in locking cam 18 is aligned with aperture 28 by rotating locking cam 18 so there is no obstruction to prevent plug 16 from being inserted into position within socket 14 of lock block 12 (i.e., cam 18 is flush with socket 14). Locking cam 18 is then rotated. If plug 16 is correctly rotationally oriented in socket 14 (i.e., plug groove 30 is aligned with aperture 28), locking cam 18 is able to rotate to a position where a portion of locking cam 18 extends outward of aperture 28 and is no longer flush therewith. In this configuration, plug 16 is oriented in the desired rotational position. Locking cam 18 (and plug 16) are held in place by actuation of spring pin stop 24 and engagement with groove 20 in head 19.

To remove sensor probe 40 from pipe section 46 while maintaining process isolation, locking cam 18 may be removed from cam bore 26 by removing retainer pin 32 from retainer pin bore 23 in locking cam 18, rotating head 19 out of the engaged position, and sliding elongated portion 21 of locking cam 18 out of cam bore 26. Sensor probe 40 may be extracted from pipe section 46 and through inner bore 39 until distal end 44 of sensor probe 40 is disposed between internal isolation valve 36 and integral pressure seals 34 (i.e., the semi-inserted position) such that integral pressure seals 34 continue to seal around sensor probe 40. Internal isolation valve 36 may then be activated to seal inner bore 39. Sensor probe 40 may then be completely removed from inner bore 39 while maintaining process isolation with internal isolation valve 36.

Alternatively, and more preferably, to remove sensor probe 40 from pipe section 46 while maintaining process isolation, spring pin stop 24 is disengaged and locking cam 18 rotated to a position wherein aperture 22 is aligned with aperture 28 (cam 18 is flush within socket 14). This releases plug 16, which, together with probe 40, may be removed from socket 14. Probe 40 is then extracted from pipe section 46.

While preferred embodiments of the present invention have been described, it is to be understood that the embodiments described are illustrative only and that the scope of the invention is to be defined solely by the appended claims when accorded a full range of equivalence in view of the many variations and modifications naturally occurring to those skilled in the art from perusal hereof.

What is claimed is:

1. A sensor mounting apparatus comprising:
    a lock block having a first end surface, a second end surface, two pairs of opposing side surfaces interconnecting said first and second end surfaces, a socket in said first end surface, an inner bore extending from said socket to said second end surface, a cam bore extending through one of said pairs of opposing side surfaces, and an integral seal mechanism capable of sealing said inner bore;
    a locking cam assembly capable of being inserted through said cam bore in said lock block, said locking cam assembly comprising a locking cam having a head with a groove and an elongated portion with a recess and a retainer pin bore extending laterally through said elongated portion, said elongated portion capable of being inserted through said cam bore in said lock block; a spring pin stop positioned within said recess of said elongated portion, said spring pin stop engaging said groove in said head when said head is rotated into an engaged position; and a retainer pin capable of being inserted through said retainer pin bore in said elongated portion to secure said locking cam in position within said cam bore of said lock block;
    an internal isolation valve removably disposed within said lock block, said internal isolation valve comprising an inner bore aligned with said inner bore of said lock block, said internal isolation valve capable of sealing said inner bore of said internal isolation valve when activated; and
    a base plate comprising an inner bore aligned with said inner bore of said internal isolation valve and said inner bore of said lock block,
    wherein said internal isolation valve and said lock block are operatively connected to said base plate.

2. The sensor mounting apparatus of claim 1, further comprising a plug having a first end surface, a second end surface, a side surface interconnecting said first and second end surfaces of said plug, a plug groove disposed on said side surface, and an inner bore extending from said first end surface to said second end surface, wherein said plug is capable of being inserted into said socket of said lock block.

3. The sensor mounting apparatus of claim 2, wherein said insertion of said plug into said socket of said lock block positions a sensor probe at a predetermined insertion depth within a process vessel.

4. The sensor mounting apparatus of claim 1, wherein an aperture is formed by an intersection of said cam bore with said socket.

5. The sensor mounting apparatus of claim 4, wherein said plug comprises an aligned position in which said sensor probe is positioned at a predetermined rotational orientation within said process vessel.

6. The sensor mounting apparatus of claim 5, wherein said plug groove is rotationally aligned with said aperture in said aligned position of said plug.

7. The sensor mounting apparatus of claim 1, wherein said internal isolation valve comprises a ball valve.

8. The sensor mounting apparatus of claim 1, wherein said integral seal mechanism comprises one or more O-rings disposed around said inner bore of said lock block.

9. A sensor mounting apparatus comprising:
    a lock block having a first end surface, a second end surface, two pairs of opposing side surfaces interconnecting said first and second end surfaces, a socket in said first end surface, an inner bore extending from said socket to said second end surface, a cam bore extending through one of said pairs of opposing side surfaces, and an integral seal mechanism capable of sealing said inner bore;
    a plug having a first end surface, a second end surface, a side surface interconnecting said first and second end surfaces of said plug, a plug groove disposed on said side surface, and an inner bore extending from said first end surface to said second end surface, wherein said plug is capable of being inserted into said socket of said lock block;
an internal isolation valve comprising an inner bore aligned with said inner bore of said lock block, said internal isolation valve capable of sealing said inner bore of said internal isolation valve when activated, wherein said internal isolation valve is removably disposed within said lock block;
a base plate comprising an inner bore aligned with said inner bore of said internal isolation valve and said inner bore of said lock block, wherein said internal isolation valve and said lock block are operatively connected to said base plate;
a locking cam having a head with a groove and an elongated portion with a recess and a retainer pin bore extending laterally through said elongated portion, said elongated portion capable of being inserted through said cam bore in said lock block;
a spring pin stop positioned within said recess of said elongated portion of said locking cam, said spring pin stop engaging said groove in said head of said locking cam when said head is rotated into an engaged position; and
a retainer pin capable of being inserted through said retainer pin bore in said elongated portion to secure said locking cam in position within said cam bore of said lock block.

10. The sensor mounting apparatus of claim 9, wherein said internal isolation valve comprises a ball valve.

11. The sensor mounting apparatus of claim 9, wherein said integral seal mechanism comprises one or more O-rings.

12. A method of mounting a sensor to a process vessel comprising the steps of:
  a) providing a sensor mounting apparatus, said sensor mounting apparatus comprising: a lock block having a first end surface, a second end surface, two pairs of opposing side surfaces interconnecting said first and second end surfaces, a socket in said first end surface, an inner bore extending from said socket to said second end surface, a cam bore extending through one of said pairs of opposing side surfaces, and an integral seal mechanism capable of sealing said inner bore; a locking cam assembly; an internal isolation valve comprising an inner bore aligned with said inner bore of said lock block, said internal isolation valve removably disposed within said lock block; a plug having a first end surface, a second end surface and an interconnecting side surface with an inner bore extending from said first end surface to said second end surface; and a base plate comprising an inner bore aligned with said inner bore of said internal isolation valve and said inner bore of said lock block, said internal isolation valve and said lock block operatively connected to said base plate;
  b) attaching said sensor mounting apparatus to a process vessel by connecting said base plate to a complementary mounting plate on said process vessel;
  c) inserting a sensor probe through said sensor mounting apparatus and into said process vessel while maintaining an isolation of a process within said process vessel; and
  d) by rotating said plug and said sensor probe within said socket and said lock block inner bore, rotationally orienting said sensor probe to a position within said socket and inner bore indicative of said sensor probe being in a required rotational orientation in said process vessel.

13. The method of claim 12, wherein step (c) comprises the steps of:
  (i) sealing said inner bore of said internal isolation valve by activating said internal isolation valve;
  (ii) inserting said sensor through said inner bore of said lock block to a semi-inserted position in which said sensor is disposed between said integral seal mechanism and said internal isolation valve;
  (iii) sealing said inner bore of said lock block with said integral seal mechanism;
  (iv) unsealing said inner bore of said internal isolation valve by deactivating said internal isolation valve; and
  (v) inserting said sensor through said inner bore of said internal isolation valve, through said inner bore of said base plate, and into said process vessel.

14. The method of claim 12, further comprising the step of removing said sensor from said process vessel through said sensor mounting apparatus while maintaining said isolation of said process within said process vessel.

15. The method of claim 14, wherein the step of removing said sensor comprises the steps of:
  (i) sliding said sensor out of said process vessel to said semi-inserted position;
  (ii) sealing said inner bore of said internal isolation valve by activating said internal isolation valve; and
  (iii) sliding said sensor out of said inner bore of said lock block.

16. The method of claim 12, further comprising the step of:
(e) removing said sensor probe from said process vessel while maintaining process isolation.

17. A method of mounting a sensor to a process vessel, comprising the steps of:
  a) providing a sensor mounting apparatus, said sensor mounting apparatus comprising: a lock block having a first end surface, a second end surface, two pairs of opposing side surfaces interconnecting said first and second end surfaces, a socket in said first end surface, an inner bore extending from said socket to said second end surface, a cam bore extending through one of said pairs of opposing side surfaces, and an integral seal mechanism capable of sealing said inner bore; a locking cam assembly; an internal isolation valve comprising an inner bore aligned with said inner bore of said lock block, said internal isolation valve removably disposed within said lock block; and a base plate comprising an inner bore aligned with said inner bore of said internal isolation valve and said inner bore of said lock block, said internal isolation valve and said lock block operatively connected to said base plate;
  b) attaching said sensor mounting apparatus to a process vessel by connecting said base plate to said process vessel;
  c) inserting a sensor through said sensor mounting apparatus and into said process vessel while maintaining an isolation of a process within said process vessel; and
  d) rotationally orienting said sensor probe in said process vessel;
  wherein said sensor mounting apparatus further comprises a plug having a first end surface, a second end surface, a side surface interconnecting said first and second end surfaces of said plug, a plug groove on said side surface, and an inner bore extending from said first end surface to said second end surface; wherein said locking cam assembly comprises a locking cam having a head with a groove and an elongated portion with a recess and a retainer pin bore extending laterally through said elongated portion, a spring pin stop positioned within said recess of said elongated portion, and a retainer pin capable of being inserted through said retainer pin bore in said elongated portion; wherein said sensor comprises a sensor probe having a proximal end and a distal end; and wherein step (c) comprises:

(i) sealing said inner bore of said internal isolation valve by activating said internal isolation valve;

(ii) inserting said sensor probe through said inner bore of said plug to secure said plug on said sensor probe at a predetermined position corresponding to a predetermined insertion depth of said distal end of said sensor probe in said process vessel;

(iii) inserting said sensor probe through said inner bore of said lock block to a semi-inserted position in which said distal end of said sensor probe is disposed between said integral seal mechanism and said internal isolation valve;

(iv) sealing said inner bore of said lock block with said integral seal mechanism;

(v) unsealing said inner bore of said internal isolation valve by deactivating said internal isolation valve; and (vi) inserting said sensor probe through said inner bore of said internal isolation valve, through said inner bore of said base plate, and into said process vessel such that said distal end of said sensor probe is positioned at said predetermined insertion depth, wherein said predetermined insertion depth is reached when said plug slides into said socket of said lock block.

18. The method of claim 17, wherein an aperture is formed in said lock block by an intersection of said cam bore with said socket; and wherein step (d) comprises the steps of:

(i) aligning said plug groove with said aperture of said lock block by rotating said plug in said socket of said lock block;

(ii) completely inserting said elongated portion of said locking cam through said cam bore of said lock block;

(iii) rotating said head of said locking cam into an engaged position in which said spring pin stop engages said groove in said head; and (iv) locking said locking cam in said cam bore by inserting said retainer pin through said retainer pin bore in said locking cam.

19. The method of claim 17, wherein step (d) comprises the steps of:

(i) positioning said elongated portion of said locking cam in said cam bore;

(ii) retaining said elongated portion of said locking cam in said cam bore by inserting said retainer pin in said retainer pin bore;

(iii) aligning an aperture in said elongated portion of said locking cam with an aperture in said socket of said lock block so that said elongated portion of said locking cam is flush with said socket;

(iv) sliding said plug within said socket; and (v) rotating said locking cam to a position indicative of said plug being in a correct rotational orientation.

* * * * *